US005429684A

United States Patent [19]

Osberghaus et al.

[11] Patent Number: 5,429,684

[45] Date of Patent: Jul. 4, 1995

[54] WATER-BASED CARPET CLEANING COMPOSITION AND METHOD

[75] Inventors: Rainer Osberghaus, Duesseldorf; Karl-Heinz Rogmann, Ratingen; Herta Tuchermann, Duesseldorf; Ansgar Behler, Bottrop, all of Germany

[73] Assignee: Henkel Kommanditgesellschaft auf Aktien, Duesseldorf, Germany

[21] Appl. No.: 74,849

[22] PCT Filed: Dec. 2, 1991

[86] PCT No.: PCT/EP91/02274

§ 371 Date: Jun. 9, 1993

§ 102(e) Date: Jun. 9, 1993

[87] PCT Pub. No.: WO92/10558

PCT Pub. Date: Jun. 25, 1992

[30] Foreign Application Priority Data

Dec. 10, 1990 [DE] Germany ........................ 40 39 348.8

[51] Int. Cl.[6] .......................... B08B 3/08; B08B 5/04; C09D 9/04; C11D 7/50

[52] U.S. Cl. .......................................... 134/3; 134/21; 134/41; 252/162; 252/171; 252/174.23; 252/174.24

[58] Field of Search ........................... 134/2, 3, 21, 41; 252/162, 171, 174.23, 174.24, 554

[56] References Cited

U.S. PATENT DOCUMENTS 1,433,887 10/1922 Hurst .................................... 134/24
2,634,238 4/1953 Soule .................................... 252/99
3,497,456 2/1970 Goodell .............................. 252/152
3,567,364 3/1971 James ...................................... 8/137
3,668,153 6/1972 Crotty ................................ 252/528
3,716,488 2/1973 Kolsky et al. ........................ 252/155
3,723,323 3/1973 Morgan et al. ....................... 252/90
3,835,071 9/1974 Allen et al. ......................... 252/545
4,294,729 10/1981 Bakos et al. ......................... 252/545
4,584,736 4/1986 Gremminger ......................... 15/322
5,073,298 12/1991 Gentle et al. ....................... 252/358

FOREIGN PATENT DOCUMENTS 3723354 1/1989 Germany .
3926344 2/1991 Germany .
0646044 11/1984 Switzerland .
1278421 6/1972 United Kingdom .
9008181 7/1990 WIPO .
9113961 9/1991 WIPO .

*Primary Examiner*—David A. Simmons
*Assistant Examiner*—Saeed Chaudhry
*Attorney, Agent, or Firm*—Ernest G. Szoke; Wayne C. Jaeschke; Real J. Grandmaison

[57] ABSTRACT

A water-based carpet cleaning composition containing 10% to 80% by weight of an alkali metal or ammonium salt of sulfonated oleic acid, up to 40% by weight of additional surfactant, up to 10% by weight of water-miscible organic solvent, up to 10% by weight of heavy metal complexing agent, 2 to 30% by weight of resoiling inhibitor, up to 1% by weight of antistatic agent, up to 3% by weight of preservatives, dyes and fragrances, and the balance, water.

10 Claims, No Drawings

WATER-BASED CARPET CLEANING COMPOSITION AND METHOD

BARCKGROUND OF THE INVENTION

1. Field of the Invention

This invention relates to a low-foaming carpet cleaning composition and to a process for cleaning large-area textile surfaces using this composition.

2. Discussion of the Related Art

Loose and fitted carpets are often cleaned in place using powder-form products which are scattered onto the carpets and removed again under suction after a mechanical treatment. More intensive cleaning is carried out with water-based cleaning solutions which are applied to the carpets and subsequently removed together with the soil after a certain contact time, optionally accompanied by a mechanical treatment. In this case, a distinction is drawn between so-called shampooing, in which a cleaning solution is first sprayed onto the carpets and worked into the carpets using brushes or similar mechanical aids before the carpets are subsequently freed by suction from the cleaning solution or rather the foam formed by the mechanical treatment, and the liquid extraction process in which the cleaning solution is sprayed onto the carpet through a pressure nozzle and, immediately afterwards, is removed from the carpet by a suction nozzle a few centimeters behind the lip of the pressure nozzle. In the institutional sector, large-area textile surfaces, particularly floor coverings or upholstery materials, are cleaned by this process using spray extraction cleaners of the type described, for example, in Swiss patent CH 646 044. Cleaners of the type in question, which have also recently been marketed for carpet cleaning in the home, consist essentially of a storage container holding a generally aqueous surfactant solution which is sprayed onto the textile surface to be cleaned through a nozzle via a hose and which penetrates more or less deeply into the material to be cleaned. The cleaning effect can be enhanced by a brush arranged at the end of the hose near the nozzle. In the working direction, the nozzle is followed by a suction unit which transports the used cleaning solution into a dirty water container. To ensure that the dirty water taken in does not overflow, the dirty water container is provided with a float contact which, when the container is full, switches off the pumps used to spray the cleaning solution and to take in the dirty water so that the dirty water container can be emptied. In any cleaning process of this type, the freedom from foam of the surfactants present in the cleaning compositions to be used has to meet stringent requirements because the cleaning solutions are sprayed onto the surfaces to be cleaned through relatively narrow nozzles and are removed by suction almost immediately afterwards. Any foam formed also enters the dirty water container and, through its volume, prevents the holding capacity of the dirty water container from being optimally utilized.

To avoid this problem, the automatic measured addition of defoamers to the used cleaning solution before it enters the dirty water container was proposed, for example, in W. Lutz, Lexikon für Reinigungs- und Hygienetechnik, 3rd Edition, 1985, page 471. This necessitates on the one hand modification of the standard spray extraction cleaner through the incorporation of a defoamer injector and, on the other hand, the use of an additional preparation which makes no contribution to the actual cleaning step.

Accordingly, the problem addressed by the present invention was to provide a low-foaming cleaning composition for carpets which would be particularly suitable for use in spray extraction cleaners.

DESCRIPTION OF THE INVENTION

This problem has been solved by the use of sulfonated oleic acid in the form of an alkali metal or ammonium salt, more particularly in the form of the disodium salt, as surfactant component in carpet cleaning compositions. Accordingly, the invention also relates to carpet cleaning compositions which contain the salts mentioned in conjunction with other cleaning-active substances.

The carpet cleaning compositions according to the invention are essentially water-based concentrates which may be used for carpet cleaning either as such or after dilution with water. They are distinguished by good cleaning performance coupled with extremely low foaming, even under heavy mechanical stressing.

The present invention also relates to a process for cleaning large-area textile surfaces, particularly carpets, using surfactant-containing aqueous solutions, in which the textile is wetted with the solution and, optionally, mechanically treated, the solution is substantially removed from the textile by suction immediately afterwards and, if desired, the textile is dried, the process being characterized by the use of a cleaning solution which has been prepared by dilution of a carpet cleaning composition containing an alkali metal or ammonium salt of sulfonated oleic acid as surfactant component. The term "immediately afterwards" derives from the interval of normally about 1 cm to 15 cm between the pressure and suction nozzles where a spray extraction cleaner is used and the speed of normally 0.5 cm per second to 50 cm per second with which the lips of the nozzles are moved over the textile to be cleaned and normally signifies a time of generally less than 2 seconds and, more particularly, less than 1 second.

The oleic acid derivatives used as surfactant component in accordance with the invention are neutralized sulfonation products which are known, for example, from GB 1,278,421 and from DE-OS 39 26 344. As described therein, they may be obtained by reaction of oleic acid or technical mixtures containing oleic acid—obtainable from renewable raw materials, more particularly beef tallow, sunflower oil, rapeseed oil or olive oil—with gaseous sulfur trioxide and subsequent hydrolysis and neutralization with aqueous bases, more particularly solutions of alkali metal or ammonium hydroxides. Depending on the origin of the technical oleic acid starting material, the resulting mixtures of alkenyl sulfonic acid/carboxylic acid salts and hydroxyalkyl sulfonic acid/carboxylic acid salts may contain more or less large amounts of salts of saturated fatty acids and sulfonation products of other unsaturated fatty acids which generally do not impair the advantageous effect on the sulfonated oleic acid in the cleaning compositions according to the invention. Sulfonated oleic acid salts such as these are preferably present in the carpet cleaning compositions according to the invention in quantities of 10% by weight to 80% by weight and, more particularly, in quantities of 15% by weight to 50% by weight.

In addition to the alkali metal or ammonium salt of sulfonated oleic acid, the compositions according to the invention may contain other low-foaming surfactants which are primarily nonionic and, preferably, anionic surfactants, although it may be advisable in individual cases to use other types of surfactant. Suitable anionic surfactants are, in particular, those of the sulfate or sulfonate type, although other types, such as soaps, long-chain N-acyl sarcosinates, salts of fatty acid cyanamides or salts of ether carboxylic acids obtainable from long-chain alkyl or alkylphenyl polyglycol ethers and chloroacetic acid, may also be used. The anionic surfactants are preferably used in the form of the sodium salts.

Particularly suitable surfactants of the sulfate type are the sulfuric acid monoesters of long-chain primary alcohols of natural and synthetic origin containing 10 to 20 carbon atoms, i.e. fatty alcohols such as, for example, coconut oil fatty alcohols, tallow fatty alcohols, oleyl alcohol, or the $C_{10-20}$ oxoalcohols and those of secondary alcohols having the same chain length. Other particularly suitable surfactants of the sulfate type are the sulfation products of the reaction products of $C_{4-12}$ alcohols alkoxylated with 1 to 12 mol ethylene oxide with 1,2-epoxyalkanes which may be obtained, for example, by the process described in DE-OS 37 23 354. In addition, the sulfuric acid monoesters of aliphatic primary or secondary alcohols alkoxylated with 1 to 6 mol ethylene oxide may be used. Suitable surfactants of the sulfonate type are the alkane sulfonates obtainable from $C_{12-18}$ alkanes by sulfochlorination or sulfoxidation and subsequent hydrolysis or neutralization and the olefin sulfonates obtained from long-chain monoolefins having a terminal or internal double bond by sulfonation with gaseous sulfur trioxide and subsequent alkaline or acidic hydrolysis of the sulfonation products.

Suitable nonionic surfactants for the process according to the invention are, in particular, adducts of 1 to 30 mol and preferably 3 to 15 mol ethylene oxide with 1 mol of a compound containing 10 to 20 carbon atoms from the group of alcohols, alkylphenols, carboxylic acids and carboxylic acid amides. The adducts of ethylene oxide and/or propylene oxide with long-chain primary or secondary alcohols, such as fatty alcohols or oxoalcohols for example, are particularly important. Surprisingly, however, the known high-foaming oligoglycosides of the alcohols mentioned are also suitable.

These additional surfactants may be present in the compositions according to the invention in quantities of, preferably, not more than 40% by weight and, more preferably, in quantities of 5% by weight to 20% by weight.

Although the carpet cleaning compositions according to the invention contain water as preferred solvent, water-miscible organic solvents may be present in small quantities. Solvents such as these include, in particular, alcohols containing 1 to 4 carbon atoms, glycols containing 2 to 4 carbon atoms and the diglycols and triglycols derived therefrom and the corresponding glycol ethers. Such solvents are, for example, methanol, ethanol, propanol, isopropanol, tert.butanol, ethylene glycol, propylene glycol, butylene glycol, diethylene glycol, triethylene glycol, dipropylene glycol, diethylene glycol monomethyl ether, diethylene glycol monoethyl ether, diethylene glycol monopropyl ether, ethylene glycol monobutyl ether and diethylene glycol monobutyl ether. Solvents such as these are present in the compositions according to the invention in quantities of, preferably, not more than 10% by weight and, more preferably, in quantities of 1% by weight to 7% by weight.

In addition, the composition according to the invention may contain other auxiliaries typically encountered in carpet cleaning compositions, including in particular preservatives, resoiling inhibitors, inorganic salts, antistatic agents, dyes and fragrances. Among the auxiliaries, above all those which are present in the cleaning composition in relatively large quantities, those types which lead to solid residues on the carpet after drying are preferred.

The auxiliaries which are intended to prevent resoiling of the carpet are, primarily, water-soluble or water-dispersible polymers which lead to brittle residues rather than films after drying. Corresponding polymers of acrylic acid and/or methacrylic acid or copolymers thereof with other ethylenically unsaturated monomers, for example styrene, are preferably used. The resoiling inhibitors are present in the compositions according to the invention in quantities of 2 to 30% by weight and, more particularly, in quantities of 5% by weight to 20% by weight.

Quaternary ammonium compounds absorbed by the textile material are normally used as the substances which impart an antistatic finish to the carpet. An antistatic effect on the carpet can also be obtained with inorganic salts. The content of antistatic agents such as these in the cleaning compositions according to the invention is preferably no more than 1% by weight and, more particularly, between 0.01% by weight and 0.5% by weight.

The heavy metal complexing agents suitable for use in the compositions according to the invention are primarily aminopolycarboxylic acids and polyphosphonic acids or salts thereof, for example nitrilotriacetic acid and hydroxyethane diphosphonic acid. Complexing agents such as these are present in the cleaning compositions according to the invention in quantities of preferably no more than 10% by weight and, more preferably, in quantities of 0.5% by weight to 2% by weight.

Preservatives, dyes and fragrances are present in the carpet cleaning compositions according to the invention in quantities of preferably not more than 3% by weight, more preferably in quantities of 0.01% by weight to 1% by weight and, most preferably, in quantities of 0.1% by weight to 0.5% by weight.

The production of the concentrates according to the invention does not involve any difficulties. It may be carried out simply by mixing the constituents which may be present either as such or in the form of aqueous solutions.

A ready-to-use cleaning solution may readily be prepared by diluting the cleaning compositions according to the invention with water.

By virtue of the minimal generation of foam and the low stability of the foam, the composition according to the invention may be used in higher concentrations in the cleaning process than in conventional processes, so that even heavily soiled textiles can be cleaned in a single operation.

A characteristic feature of the process according to the invention is the composition of the cleaning solution to be used which is obtained by diluting the carpet cleaning concentrate according to the invention with water. The cleaning composition according to the invention is preferably used in a quantity of 5 ml to 100 ml and, more preferably, in a quantity of 10 ml to 20 ml per liter of the final cleaning solution. The pH value of the ready-to-use solution is preferably in the range from 4 to 12 and, more preferably, in the range from 6 to 8.

The process according to the invention preferably uses a spray extraction cleaner of the type described above. After removal of the cleaning solution, the carpet is dried. This can be done by leaving the carpet standing in air, which can mean drying times of up to 2 days. However, drying can be accelerated by using air blowers or heaters.

The new cleaning process has particular advantages in the cleaning of carpets in place because fitted carpets are not accessible to the cleaning processes for loose textiles. The process according to the invention has the same advantages in the case of other textiles which are not readily accessible to a conventional washing process, such as wall coverings and upholstered furniture. Even when applied to loose carpets, it affords advantages by virtue of its simplicity over the very complicated washing processes typically used for such textiles. The process according to the invention is distinguished not only by a good result in surface cleaning, but also by a minimal tendency of the cleaned textile towards resoiling. Pretreatment of the textiles to be cleaned is not normally necessary. The process is suitable both for carpets of synthetic fibers, such as polyamide for example, and for relatively delicate textiles of natural fibers, such as wool for example.

EXAMPLES

Example 1

Preparation of the disodium salt of sulfonated oleic acid

The disodium salt of sulfonated oleic acid used for the production of the cleaning composition according to the invention was obtained by sulfonation of a technical oleic acid from beef tallow (composition: 70.7% by weight oleic acid, 11.8% by weight linoleic acid, rest other $C_{12-20}$ fatty acids; acid value 200.4, iodine value 98.3) with sulfur trioxide and subsequent neutralization and hydrolysis. The sulfonation was carried out in a tubular falling-film reactor of glass (length 110 cm, internal diameter 6 mm) which was surrounded by a heating or cooling jacket and which was provided at its head with a feed unit for the oleic acid and with a gas inlet pipe. The oleic acid was introduced at a constant rate of 550 g per hour. Gaseous sulfur trioxide (produced by heating oleum) was diluted with nitrogen to a concentration of 5% by volume sulfur trioxide and introduced into the reactor at such a rate that the molar ratio of olefinic double bonds present in the technical oleic acid (calculated from the iodine value) to sulfur trioxide was 1:0.9. The reaction temperature was kept at 50° C. by the circulation of water through the reactor jacket. After leaving the reactor, the reaction mixture was collected in a glass vessel containing 25% by weight aqueous sodium hydroxide and was heated for 2 hours to 90° C. at a pH value of 8 to 9. The required disodium salt (T1) was obtained in a concentration of 60% by weight in water.

Example 2

The cleaning compositions according to the invention characterized by their composition in Table 1 below were produced by simple mixing of the constituents.

TABLE 1

| Composition of the cleaning compositions according to the invention [% by weight] | CC1 | CC2 | CC3 | CC4 |
|---|---|---|---|---|
| T1 | 60 | 25 | 20 | 24 |
| 7× Ethoxylated $C_{9/11}$ alcohol (Lutensol ® ON 70; BASF) | — | 20 | — | 6 |
| $C_{12/14}$ alkyl glucoside, degree of polymerization 1.4 | — | — | 20 | — |
| 6× Ethoxylated $C_{12/14}$ fatty acid (Eumulgin ® Ti 60; Henkel) | — | — | — | 8 |
| Li $C_{8/12}$ alkyl sulfate (Texapon ® LLS; Henkel) | — | — | 5 | — |
| Sulfated hydroxyether[a)] | — | 10 | — | 8 |
| Na nitrilotriacetate | — | 0.2 | — | 0.8 |
| Na tripolyphosphate | — | — | 3 | — |
| Poly(methylmethacrylate) (Neocryl ® NH 20; ICI) | — | 10 | — | — |
| Copolymer of acrylic acid and styrene (Ubatol ® TR 1138; Stapol) | — | — | 5 | — |
| Ethanol | 5 | — | 3 | — |
| Propylene glycol monobutyl ether | — | 10 | — | 6 |
| Chloroacetamide | — | 0.2 | 0.2 | 0.2 |
| Water, fragrance, dye | ad 100 | | | |

[a)] Na salt of the sulfation product of the reaction product of N-butanol alkoxylated with 10 mol equivalents ethylene oxide with 1,2-epoxyoctane according to DE 37 23 354

Example 3

To test the cleaning effect of the process according to the invention, a typically soiled polyamide velvet-pile carpet was cleaned with aqueous solutions containing 1% by weight of compositions CC1 to CC4 according to the invention using a Floordress ® SB 2412 spray extraction cleaner. For comparison, corresponding carpet samples were cleaned under the same conditions with commercial carpet cleaning compositions C1 consisting of 25% by weight alkyl polyglycol ether, 3% by weight Na cumene sulfonate, 0.2% by weight silicone foam inhibitor, 0.1% by weight preservative, balance to 100% by weight water), C2 consisting of 8% by weight epoxy fatty acid, 5% by weight fatty acid polyglycol ester, 0.3% by weight fragrance, 0.2% by weight preservative, balance to 100% by weight water) and C3 (consisting of 8% by weight alkyl polyglycol ether, 8.5% by weight Na cumene sulfonate, 2% by weight aminotrimethylene phosphonic acid, 1% by weight sodium hydroxide, balance to 100% by weight water).

The machine foaming intensity of the compositions (1=high foaming, 10=no foam), foam stability (1=very stable foam, 10=very unstable foam) and the cleaning effect (1=no difference in relation to the uncleaned textile, 10=satisfactorily clean) and the tendency of the cleaned carpet (1=serious resoiling, 10=no resoiling) were marked by trained examiners.

TABLE 2

| | Evaluation marks | | | | | | |
|---|---|---|---|---|---|---|---|
| | CC1 | CC2 | CC3 | CC4 | C1 | C2 | C3 |
| Foaming intensity | 9 | 8 | 8 | 9 | 7 | 6 | 7 |
| Foam stability | 10 | 9 | 9 | 8 | 6 | 6 | 6 |
| Cleaning | 9 | 10 | 9 | 8 | 8 | 9 | 9 |
| Resoiling | 10 | 9 | 8 | 9 | 6 | 6 | 6 |

We claim:

1. A water-based carpet cleaning composition comprising 10% to 80% by weight of an alkali metal or ammonium salt of sulfonated oleic acid, up to 40% by weight of low-foaming nonionic and anionic surfactant, up to 10% by weight of water-miscible organic solvent selected from the group consisting of alcohols containing 1 to 4 carbon atoms and glycols containing 2 to 4 carbon atoms and the diglycols and tri-glycols derived therefrom and the corresponding glycol ethers, up to 10% by weight of heavy metal complexing agent selected from the group consisting of aminopolycarboxylic acids and polyphosphoric acids or salts thereof, 2 to 30% by weight of resoiling inhibitor selected from the group consisting of water-soluble or water-dispersible polymers, up to 1% by weight of quaternary ammonium compound antistatic agent, up to 3% by weight of preservatives, dyes and fragrances, and the balance, water.

2. A composition as in claim 1 wherein said salt of sulfonated oleic acid comprises the disodium salt.

3. A composition as in claim 1 containing 15% to 50% by weight of said salt of sulfonated oleic acid, 5% to 20% by weight of said low-foaming surfactant, 1% to 7% by weight of said organic solvent, 0.5% to 2% by weight of said complexing agent, 5% to 20% by weight of said resoiling inhibitor and 0.1 to 0.5% by weight of preservatives, dyes and fragrances.

4. The process of cleaning a carpet, comprising contacting said carpet with a water-based composition containing 10% to 80% by weight of an alkali metal or ammonium salt of sulfonated oleic acid, up to 40% by weight of low-foaming nonionic and anionic surfactant, up to 10% by weight of water-miscible organic solvent selected from the group consisting of alcohols containing 1 to 4 carbon atoms and glycols containing 2 to 4 carbon atoms and the diglycols and tri-glycols derived therefrom and the corresponding glycol ethers, up to 10% by weight of heavy metal complexing agent selected from the group consisting of aminopolycarboxylic acids and polyphosphoric acids or salts thereof, 2 to 30% by weight of resoiling inhibitor selected from the group consisting of water-soluble or water-dispersible polymers, up to 1% by weight of quaternary ammonium compound antistatic agent, up to 3% weight of preservatives, dyes and fragrances, and the balance, water, and removing said composition from said carpet.

5. A process as in claim 4 wherein after contacting said carpet with said composition, mechanically treating said carpet.

6. A process as in claim 4 including removing said composition from said carpet by suction.

7. A process as in claim 4 wherein said composition is applied to said carpet in a quantity of 5 ml to 100 ml per liter of cleaning solution.

8. A process as in claim 4 wherein said composition is applied to said carpet by a spray-extraction cleaning apparatus and is removed with said apparatus.

9. A process as in claim 4 wherein said salt of sulfonated oleic acid comprises the disodium salt.

10. A process as in claim 4 wherein said composition contains 15% to 50% by weight of said salt of sulfonated oleic acid, 5% to 20% by weight of said low-foaming surfactant, 1% to 7% of said organic solvent, 0.5% to 2% by weight of said complexing agent, 5% to 20% by weight of said resoiling inhibitor and 0.1 to 0.5% by weight of preservatives, dyes and fragrances.

* * * * *